United States Patent
Tazawa et al.

(10) Patent No.: US 9,885,837 B2
(45) Date of Patent: Feb. 6, 2018

(54) OPTICAL DEVICE

(71) Applicant: Sumitomo Electric Industries, Ltd., Osaka-shi (JP)

(72) Inventors: Hidehisa Tazawa, Yokohama (JP); Kenichiro Takahashi, Yokohama (JP)

(73) Assignee: Sumitomo Electric Industries Ltd., Osaka-shi (JP)

(*) Notice: Subject to any disclaimer, the term of this patent is extended or adjusted under 35 U.S.C. 154(b) by 0 days.

(21) Appl. No.: 15/132,994

(22) Filed: Apr. 19, 2016

(65) Prior Publication Data

US 2016/0306116 A1  Oct. 20, 2016

(30) Foreign Application Priority Data

Apr. 20, 2015 (JP) .................................. 2015-085960
Feb. 12, 2016 (JP) .................................. 2016-025269

(51) Int. Cl.
*G02B 6/32* (2006.01)
*G02B 6/293* (2006.01)
(Continued)

(52) U.S. Cl.
CPC ............. *G02B 6/32* (2013.01); *G02B 6/3514* (2013.01); *G02B 6/3518* (2013.01);
(Continued)

(58) Field of Classification Search
None
See application file for complete search history.

(56) References Cited

U.S. PATENT DOCUMENTS

| 2004/0017964 | A1* | 1/2004 | Takeyama ................ G02B 6/32 385/18 |
| 2004/0051956 | A1 | 3/2004 | Suzuki |
| 2007/0078254 | A1* | 4/2007 | Matsumoto ............ G02B 1/041 528/44 |

FOREIGN PATENT DOCUMENTS

| JP | 2004-020720 A | 1/2004 |
| JP | 2004-070050 A | 3/2004 |
| JP | 2004-309896 A | * 11/2004 |

OTHER PUBLICATIONS

Ohara Inc., L-LAM60 datasheet, retrieved from http://www.ohara-inc.co.jp/en/product/optical/dl/data/ellam60.pdf on Jun. 8, 2017.*
(Continued)

*Primary Examiner* — Mike Stahl
(74) *Attorney, Agent, or Firm* — Venable LLP; Michael A. Sartori; Miguel A. Lopez

(57) ABSTRACT

An optical device is equipped with an input/output module having at least one optical fiber, a movable mirror which deflects, toward the input/output module, light that is received from the input/output module, and a lens which couples the input/output module and the deflection unit to each other optically and has a focal length that is greater than or equal to 2.0 mm and shorter than 3.5 mm. A dispersion index ν of the optical device that is given by an equation:

$$\nu = \{n(1.45)-1\}/\{n(1.2)-n(1.7)\}$$

where n(1.45), n(1.2), and n(1.7) are refractive indices of a glass material of the lens at wavelengths 1.45 μm, 1.2 μm, and 1.7 μm, respectively, is larger than or equal to 100. The wavelength dependence of an optical characteristic of this optical device is weaker than that of conventional optical devices.

11 Claims, 15 Drawing Sheets

(51) Int. Cl.
 *G02B 6/35* (2006.01)
 *G02B 27/00* (2006.01)
(52) U.S. Cl.
 CPC .......... *G02B 6/29394* (2013.01); *G02B 6/353* (2013.01); *G02B 27/0062* (2013.01); *Y10S 501/902* (2013.01)

(56) References Cited

OTHER PUBLICATIONS

Ohara Inc., Comparative Table of Recommended Glasses, retrieved from http://www.ohara-inc.co.jp/en/product/optical/opticalglass/01010.html on Jun. 8, 2017.*

* cited by examiner

FIG. 4

| WAVELENGTH λ (μm) | REFRACTIVE INDEX n | | | | |
|---|---|---|---|---|---|
| | GLASS MATERIAL-1 | GLASS MATERIAL-2 | GLASS MATERIAL-3 | GLASS MATERIAL-4 | GLASS MATERIAL-5 |
| 1.2 | 1.432243 | 1.488543 | 1.504324 | 1.57521 | 1.723323 |
| 1.3 | 1.431646 | 1.487785 | 1.503079 | 1.573835 | 1.721664 |
| 1.4 | 1.431065 | 1.487049 | 1.501839 | 1.572475 | 1.720072 |
| 1.45 | 1.430776 | 1.486684 | 1.501212 | 1.571792 | 1.719287 |
| 1.5 | 1.430488 | 1.486319 | 1.500579 | 1.571103 | 1.718505 |
| 1.6 | 1.429905 | 1.485584 | 1.499287 | 1.569702 | 1.716936 |
| 1.7 | 1.429311 | 1.484834 | 1.497948 | 1.568259 | 1.715344 |
| DISPERSION INDEX ν(1.45) | 146.9222 | 131.2170 | 78.60916 | 82.26039 | 90.14751 |
| | EXAMPLE 1 | | COMPARATIVE EXAMPLE | | EXAMPLE 2 |

OPTICAL DEVICE

CROSS-REFERENCE TO RELATED APPLICATION

The present application claims the benefit of priority of Japanese Patent Applications No. 2015-085960, filed on Apr. 20, 2015, and No. 2016-025269, filed on Feb. 12, 2016, which is incorporated herein by reference.

TECHNICAL FIELD

The present invention relates to an optical device.

BACKGROUND

Optical devices used in PON (passive optical network) systems which realize economical optical access systems are required to be increased in bandwidth because PON systems handle optical signals in the 1.3-µm band or the 1.55-µm band. Widening of a bandwidth used is also required of DWDM (dense wavelength division multiplex) communication systems which multiplex and transmit optical signals and are used in high-speed, large-capacity core optical communication networks.

Optical switches are known that are equipped with plural optical fibers disposed in a capillary, a planar mirror for deflecting light emitted from an optical fiber, and a lens for optically coupling the set of optical fibers and the planar mirror to each other (refer to JP-A-2004-070050, for example).

However, in the above optical switches, the optical characteristic of the optical switch may vary due to wavelength dependence of the focal length of the collimating lens. The wavelength dependence of the focal length of the collimating lens results from the fact that the refractive index of the collimating lens depends on the wavelength of received light.

On the other hand, optical fiber coupling systems are known in which the wavelength dependence of the focal length of a collimating lens is suppressed (refer to JP-A-2004-020720, for example). In particular, it is disclosed that the wavelength dispersion of the collimating lens in an infrared range is suppressed by paying attention to an infrared dispersion index x and a refractive index of a glass material of the collimating lens at a wavelength 1.55 µm. Like the Abbe number, the infrared dispersion index x represents wavelength dispersion of a glass material in an infrared range.

However, in, for example, the optical fiber coupling system disclosed in JP-A-2004-020720, the focal length of the collimating lens is relatively short (f=1.5 mm) and the collimating lens, a semiconductor laser, and an optical fiber are optically coupled with each other in such a manner that their optical axes approximately coincide with each other.

Therefore, no consideration is now being given to application of this optical fiber coupling system to an optical fiber coupling system that uses a lens having a relatively great focal length or an optical fiber coupling system in which light shines on and exits from an off-axis position of a collimating lens. In these cases, the wavelength dispersion of the optical characteristic of the optical fiber coupling system becomes noticeable.

SUMMARY OF THE INVENTION

The present invention provides an optical device the wavelength dependence of whose optical characteristic is suppressed.

An optical device according to one aspect of the present invention comprises an input/output module having at least one optical fiber; a deflection unit which deflects, toward the input/output module, light that is received from the input/output module; and a lens which couples the input/output module and the deflection unit to each other optically and has a focal length that is greater than or equal to 2.0 mm and shorter than 3.5 mm, wherein a dispersion index ν of the optical device that is given by an equation:

$$\nu = \{n(1.45)-1\}/\{n(1.2)-n(1.7)\}$$

where $n(1.45)$, $n(1.2)$, and $n(1.7)$ are refractive indices of a glass material of the lens at wavelengths 1.45 µm, 1.2 µm, and 1.7 µm, respectively, is larger than or equal to 100.

The present invention makes it possible to suppress the wavelength dependence of an optical characteristic of an optical device that uses a lens having a relatively great focal length.

BRIEF DESCRIPTION OF THE DRAWINGS

FIG. 4 is a table showing refractive index values n at respective wavelengths λ and a dispersion index value ν of each of glass material-1 to glass material-5 of a lens;

DETAILED DESCRIPTION

Figure 1:
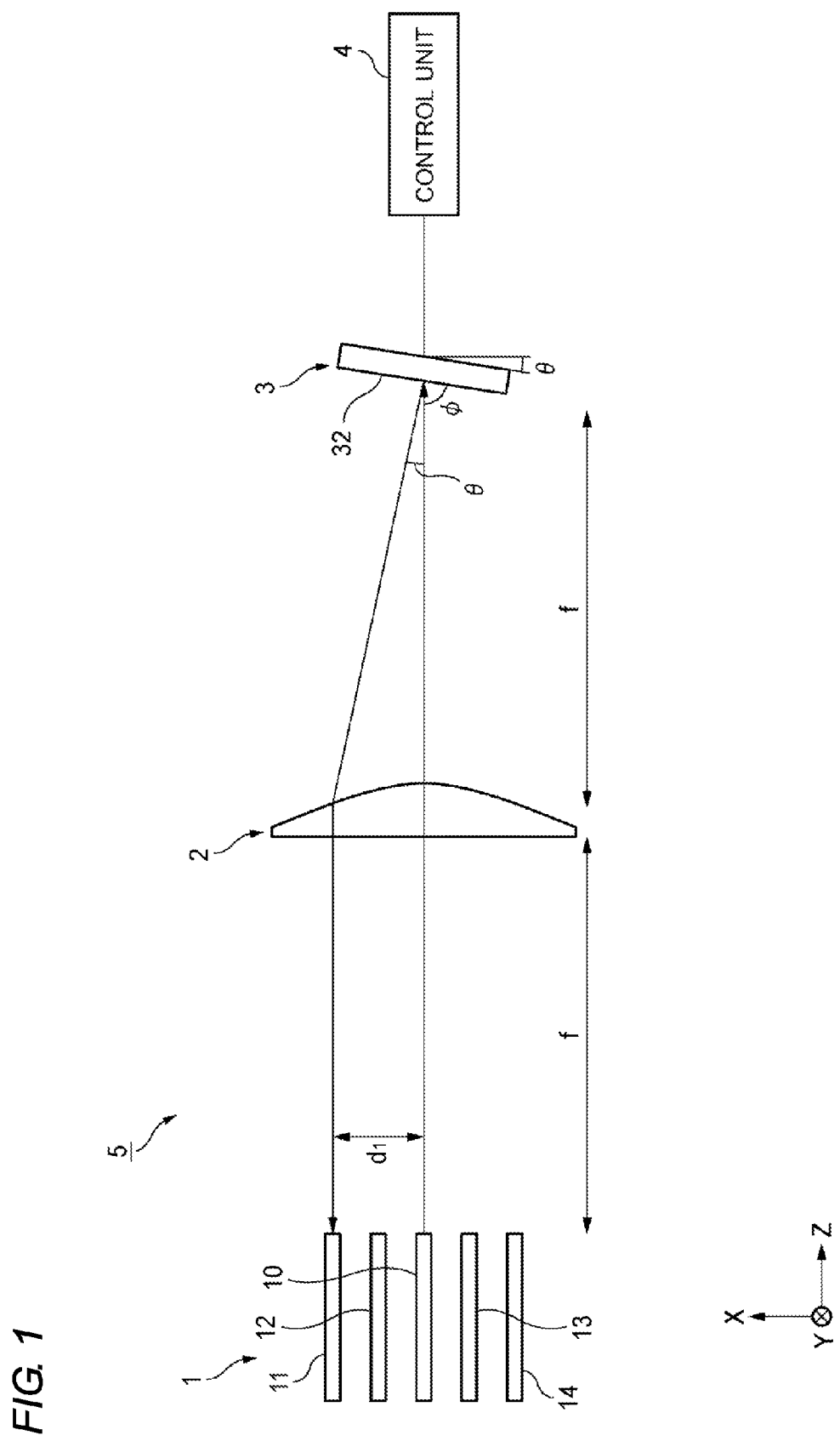
FIG. 1 is a schematic diagram showing an optical device according to a first embodiment of the present invention which is an optical switch.

Outline of Embodiments of the Present Invention

Embodiments of the present invention will outlined below.

(1) An optical device comprising:
an input/output module having at least one optical fiber;
a deflection unit which deflects, toward the input/output module, light that is received from the input/output module; and
a lens which couples the input/output module and the deflection unit to each other optically and has a focal length that is greater than or equal to 2.0 mm and shorter than 3.5 mm,
wherein a dispersion index ν of the optical device that is given by an equation:

$$\nu = \{n(1.45) - 1\}/\{n(1.2) - n(1.7)\}$$

where n(1.45), n(1.2), and n(1.7) are the refractive indices of a glass material of the lens at wavelengths 1.45 μm, 1.2 μm, and 1.7 μm, respectively, is larger than or equal to 100.

This configuration makes it possible to suppress the wavelength dependence of the optical characteristic of an optical device that uses a lens having a relatively great focal length.

(2) The optical device according to item (1), wherein the focal length is greater than or equal to 2.0 mm and shorter than or equal to 3.0 mm.

This configuration makes it possible to suppress the wavelength dependence of the optical characteristic of an optical device further.

(3) The optical device according to item (1) or (2), wherein the dispersion index ν is larger than or equal to 130.

This configuration makes it possible to suppress the wavelength dependence of the optical characteristic of an optical device further.

(4) The optical device according to any one of items (1) to (3), wherein the lens is a spherical lens, and the glass material of the lens is such that a difference between a maximum value and a minimum value of the transmittance T(λ) of the optical device in a wavelength range of 1.2 to 1.7 μm is smaller than or equal to 0.3 dB, the transmittance T(λ) being given by an equation:

$$T(\lambda) = 10 \cdot \log \{Pout(\lambda)/Pin(\lambda)\}$$

where Pin(λ) is intensity of light that is emitted from the input/output module and has a wavelength λ and Pout(λ) is intensity of light that is coupled into the input/output module via the lens and the deflection unit and has the wavelength λ.

With this configuration, by virtue of a good optical characteristic of the glass material of the lens, various aspherical surface parameters can be employed in the lens, whereby further improvement in characteristic is expected. As a result, the degree of freedom of lens designing can be increased.

(5) The optical device according to any one of items (1) to (4), wherein the lens is a spherical lens, and the glass material of the lens is such that the transmittance T(λ) of the optical device is larger than or equal to −0.5 dB in a wavelength range of 1.2 to 1.7 μm, the transmittance T(λ) being given by an equation:

$$T(\lambda) = 10 \cdot \log \{Pout(\lambda)/Pin(\lambda)\}$$

where Pin(λ) is intensity of light that is emitted from the input/output module and has a wavelength λ and Pout(λ) is intensity of light that is coupled into the input/output module via the lens and the deflection unit and has the wavelength λ.

With this configuration, by virtue of a good optical characteristic of the glass material of the lens, various aspherical surface parameters can be employed in the lens, whereby further improvement in characteristic is expected. As a result, the degree of freedom of lens designing can be increased.

(6) The optical device according to item (4) or (5), wherein the lens is an aspherical lens, and the glass material of the lens is such that the maximum value of the transmittance T(λ) is larger than or equal to −0.1 dB and the difference between the maximum value and the minimum value of the transmittance T(λ) is smaller than or equal to 0.2 dB in the wavelength range of 1.2 to 1.7 μm, and that a transmittance T(1.2) at a wavelength 1.2 μm is approximately equal to a transmittance T(1.7) at a wavelength 1.7 μm.

This configuration makes it possible to provide an optical device that exhibits a good optical characteristic at each wavelength and in which the wavelength dependence of the optical characteristic is suppressed. Furthermore, since the transmittance T(1.2) is approximately equal to the transmittance T(1.7), an optical device can be provided that is highly suitable for an optical system.

(7) An optical device comprising:
an input/output module having at least one optical fiber;
a deflection unit which deflects, toward the input/output module, light that is received from the input/output module; and
a lens which couples the input/output module and the deflection unit to each other optically and has a focal length that is greater than or equal to 2.0 mm and shorter than 3.5 mm,
wherein a dispersion index ν of the optical device that is given by an equation:

$$\nu = \{n(1.45) - 1\}/\{n(1.2) - n(1.7)\}$$

where n(1.45), n(1.2), and n(1.7) are refractive indices of a glass material of the lens at wavelengths 1.45 μm, 1.2 μm, and 1.7 μm, respectively, is larger than or equal to 90, and the refractive index n(1.45) at the wavelength 1.45 μm is larger than or equal to 1.7.

This configuration makes it possible to provide an optical device that exhibits a good optical characteristic.

(8) The optical device according to item (7), wherein the focal length is greater than or equal to 2.0 mm and shorter than or equal to 3.0 mm.

This configuration makes it possible to provide an optical device that exhibits a good optical characteristic and in which the wavelength dependence of the optical characteristic is suppressed.

(9) The optical device according to item (7) or (8), wherein the lens is a spherical lens, and the glass material of the lens is such that the transmittance $T(\lambda)$ of the optical device is larger than or equal to −0.5 dB in a wavelength range of 1.2 to 1.7 μm, the transmittance $T(\lambda)$ being given by an equation:

$$T(\lambda)=10 \cdot \log \{Pout(\lambda)/Pin(\lambda)\}$$

where $Pin(\lambda)$ is intensity of light that is emitted from the input/output module and has a wavelength $\lambda$ and $Pout(\lambda)$ is intensity of light that is coupled into the input/output module via the lens and the deflection unit and has the wavelength $\lambda$.

With this configuration, by virtue of a good optical characteristic of the glass material of the lens, various aspherical surface parameters can be employed in the lens, whereby further improvement in characteristic is expected. As a result, the degree of freedom of lens designing can be increased.

(10) The optical device according to item (9), wherein the lens is an aspherical lens, and the glass material of the lens is such that the maximum value of the transmittance $T(\lambda)$ is larger than or equal to −0.1 dB in the wavelength range of 1.2 to 1.7 lam, and that a transmittance $T(1.2)$ at a wavelength 1.2 μm is approximately equal to a transmittance $T(1.7)$ at a wavelength 1.7 μm.

This configuration makes it possible to provide an optical device that exhibits a good optical characteristic at each wavelength. Furthermore, since the transmittance $T(1.2)$ is approximately equal to the transmittance $T(1.7)$, an optical device can be provided that is highly suitable for a PON communication optical system.

(11) The optical device according to any one of items (1) to (10), wherein:

the optical device is an optical switch;

the input/output module comprises an input optical fiber which emits light and first and second optical fibers to receive, via the lens, light deflected by the deflection unit; and the optical device further comprises a control unit which causes the light deflected by the deflection unit to shine on the first output fiber or the second output fiber by varying the light deflection angle of the deflection unit.

This configuration makes it possible to suppress the wavelength dependence of the optical characteristic of an optical switch that uses a lens having a relatively great focal length.

Details of Embodiments of the Invention

The embodiments of the invention will be hereinafter described in detail with reference to the drawings. In the following description of the embodiments, for convenience of description, descriptions for members, units, etc. bearing the same reference symbols as ones that have already been described are omitted. Furthermore, for convenience of description, the dimension of each member shown in drawings may be different from its actual dimensions.

In the descriptions of the embodiments, to facilitate their understanding, the X-axis direction, the Y-axis direction, and the Z-axis direction will be mentioned when necessary. These directions are relative ones that are set for an optical device 5, 5a, or 5b in FIG. 1, 14, or 15. Therefore, attention should be paid to the fact that when the optical device 5, 5a, or 5b is rotated about a certain direction, at least one of the X-axis direction, the Y-axis direction, and the Z-axis direction is changed accordingly.

The term "X-axis direction" includes both of the +X direction and the −X direction. Likewise, the term "Y-axis direction" includes both of the +Y direction and the −Y direction and the term "Z-axis direction" includes both of the +Z direction and the −Z direction. For example, the term "+X direction" or "−X direction" will be used when it is necessary to indicate the corresponding one of the two directions (vectors) of the "X-axis direction."

Embodiment 1

FIG. 1 is a schematic diagram showing an optical device 5 according to a first embodiment. In the first embodiment, the optical device 5 is an optical switch. The optical device 5 is equipped with an input/output module 1, a lens 2, a movable mirror 3, and a control unit 4. For convenience of description, only a ray (hereinafter referred to as a central ray) that is part of divergent light emitted from an input optical fiber 10 shown in FIG. 1 and goes parallel with the optical axis of the lens 2.

The input/output module 1 has the input optical fiber 10 which emits light and output optical fibers 11-14 (first and second output optical fibers) which receive light. The input optical fiber 10 functions as an input port and the output optical fibers 11-14 function as output ports. Each of the optical fibers 10-15 is a single-mode optical fiber, for example, and is equipped with a core through which light propagates and a clad that covers the core.

Figure 2A:
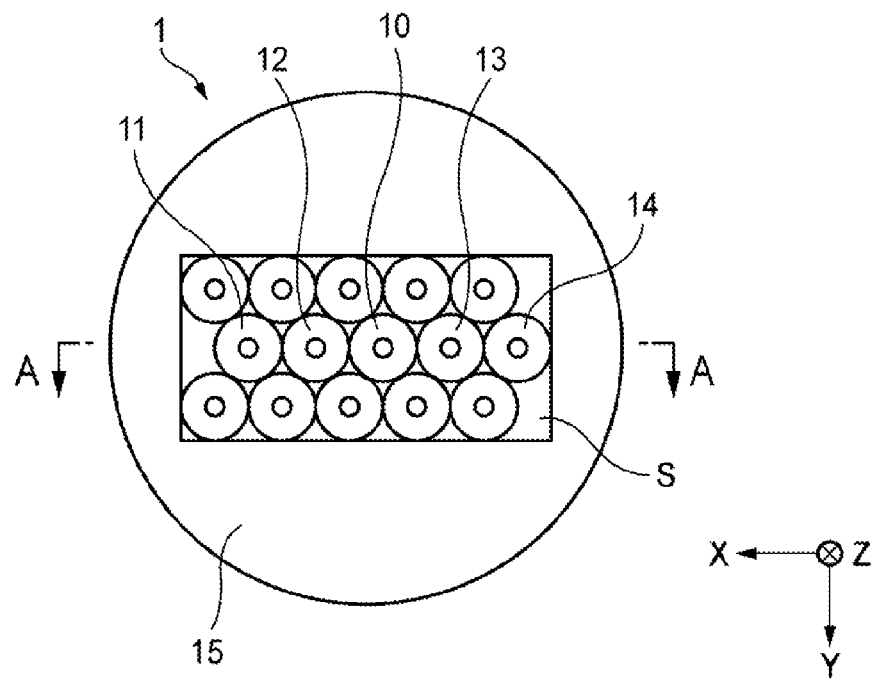
FIG. 2A is a sectional view taken perpendicularly to the Z-axis direction and showing an example specific configuration of an input/output module.
Figure 2B:
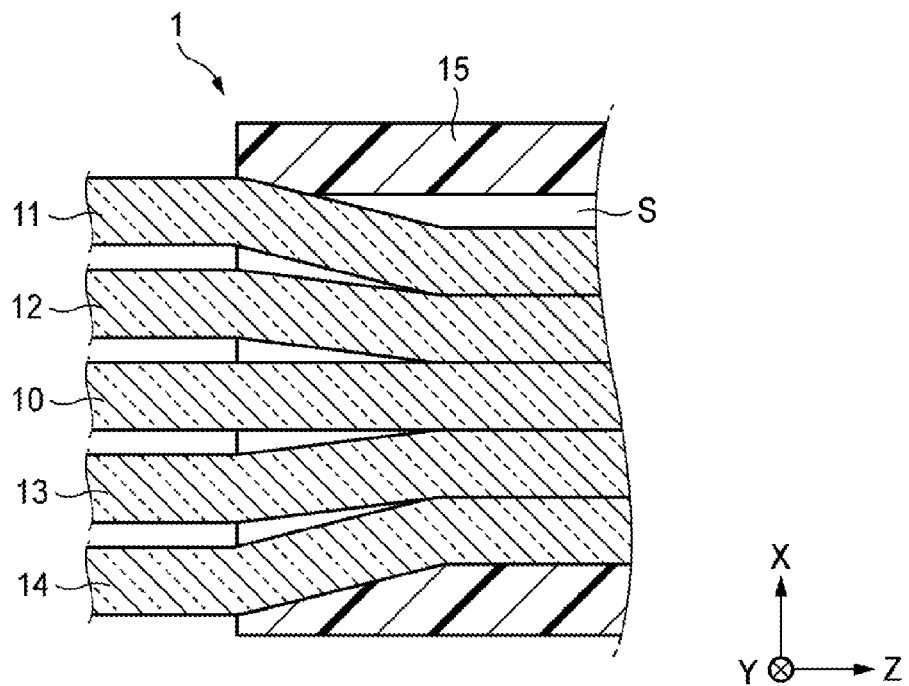
FIG. 2B is a sectional view of the input/output module 1 taken along line A-A in FIG. 2A.

FIG. 2A is an XY sectional view showing an example specific configuration of the input/output module 1, and FIG. 2B is a sectional view of the input/output module 1 taken along line A-A in FIG. 2A.

The input/output module 1 has plural optical fibers and a ferrule 15 which covers the plural optical fibers. The ferrule 15 has a through-hole S which extends in the Z-axis direction and the plural optical fibers are held in the through-hole S. The plural optical fibers are arranged in juxtaposition in the X-axis direction and stacked in the Y-axis direction. The optical fibers 10-14 shown in FIG. 1 are the group of optical fibers that are located in the central layer in the Y-axis direction.

A portion of the through-hole S is tapered in the Z-axis direction, where the width of the through-hole S in the X-axis direction decreases as the position goes in the +Z direction from the end of the ferrule 15. This facilitates insertion of the plural optical fibers into the through-hole S and makes it possible to arrange the optical fibers densely in the X-axis direction.

The lens 2 is a plano-convex lens which couples the input/output module 1 and the movable mirror 3 to each other optically, and has a flat surface that is opposed to the input/output module 1 and a curved surface that is opposed to the movable mirror 3. The exit end of the input optical fiber 10 is placed at the front focal point of the lens 2, and the reflection surface of the movable mirror 3 is placed at the rear focal point of the lens 2. It suffices that the lens 2 be a collimating lens, and, as described later, the lens 2 can be implemented as a spherical lens or an aspherical lens.

The movable mirror 3 is a deflection unit, the term used in the claims. The movable mirror 3 deflects, toward one of the output optical fibers 11-14, light that comes from the input optical fiber 10. In the movable mirror 3 which is a MEMS mirror, for example, the angle φ of the reflection surface 32 of the movable mirror 3 with respect to the optical axis of the lens 2 (or the angle θ between the optical axis of the lens 2 and the normal vector of the reflection surface 32) can be controlled electrically. Alternatively, a liquid crystal device or the like that controls the deflection angle of light by phase modulation may be employed as a deflection unit for controlling the deflection angle of light electrically.

The control unit 4 controls the deflection angle of light of the movable mirror 3. By controlling the angle φ (or angle θ) of the movable mirror 3, the control unit 4 causes received light to shine on one of the output optical fibers 11-14. The control unit 4 can control the angle φ (or angle θ) electrically by varying the voltage applied to the movable mirror 3. In FIG. 1, the control unit 4 electrically controls the inclination angle of the movable mirror 3 so that light received by the movable mirror 3 shines on the output optical fiber 11.

Light that is emitted from the input optical fiber 10 is collimated by the lens 2 and then shines on the movable mirror 3. The light that is reflected by the movable mirror 3 at the reflection angle θ is deflected by the lens 2 so as to go along the optical axis of the output optical fiber 11. Although in FIG. 1 the input optical fiber 10 and the movable mirror 3 are placed on the optical axis of the lens 2, the input optical fiber 10 need not always be disposed on the optical axis of the lens 2.

When light that is emitted from the input optical fiber 10 is caused to shine on the output optical fiber 11 by the movable mirror 3, the reflection angle θ satisfies the following Equation (1):

$$\theta = \tan^{-1}(d1/f) \quad (1)$$

where d1 is the distance between the input optical fiber 10 and the output optical fiber 11 in the X-axis direction and f is the focal length of the lens 2.

When Equation (1) is satisfied, the central ray of light deflected by the lens 2 coincides with the optical axis of the output optical fiber 11. In this state, the transmittance T of the optical device 5 which is given by the following Equation (2) has a maximum value:

$$T = 10 \cdot \log(P\text{out}/P\text{in}) \quad (2)$$

where Pin is the intensity of light emitted from the input optical fiber 10 and Pout is the intensity of light that is coupled into the output optical fiber 11 via the lens 2 and the movable mirror 3.

The intensity Pout of light that is coupled into the output optical fiber 11 can be adjusted by increasing or decreasing, by Δθ, the reflection angle θ which is given by Equation (1).

On the other hand, when light that is emitted from the input optical fiber 10 is caused to shine on the output optical fiber 12 by the movable mirror 3, the reflection angle θ satisfies the following Equation (3):

$$\theta = \tan^{-1}(d2/f) \quad (3)$$

where d2 is the distance between the input optical fiber 10 and the output optical fiber 12 in the X-axis direction It is preferable that the variation Δθ of the reflection angle θ be small. In particular, if a large angular variation Δθ is necessary to switch the output optical fiber, a large power is to be consumed by the movable mirror 3 and the movable mirror 3 needs to be a special MEMS system. In addition, the MEMS system may be damaged when the reflection angle θ is unduly large.

Therefore, it is preferable that the lens 2 that is employed in the embodiment have a relatively large focal length f. Increasing the focal length f makes it possible to decrease the angular variation Δθ that is necessary for switching of the output optical fiber and hence to increase the number of output ports. It is preferable that the focal length f be greater than or equal to 2.0 mm, and is particularly preferable that the focal length f be greater than or equal to 2.5 mm. As described later, it is preferable that the focal length f be shorter than 3.5 mm, and is particularly preferable that the focal length f be shorter than or equal to 3.0 mm. In the embodiment, the focal length f of the lens 2 is set greater than or equal to 2.0 mm and shorter than 3.5 mm.

When light whose wavelength is different from a standard wavelength is input to the optical device 5, the optical characteristic of the optical device 5 varies due to the wavelength dependence of the focal length f of the lens 2. This wavelength dependence results from the fact that the refractive index of the lens 2 varies depending on the wavelength of light incident on it. That is, the optical characteristic of the optical device 5 varies depending on the wavelength of input light because of the phenomenon (hereinafter referred to as "dispersion") occurring in the lens 2 that light components having different wavelengths are separated from each other in a medium.

In particular, when the optical device 5 is applied to a PON communication system, input light includes many wavelengths in a range of 1.2 to 1.7 μm. As a result, the optical characteristic of the optical device 5 varies depending on the wavelength of the input light to lower the reliability of the PON communication system.

Figure 3:
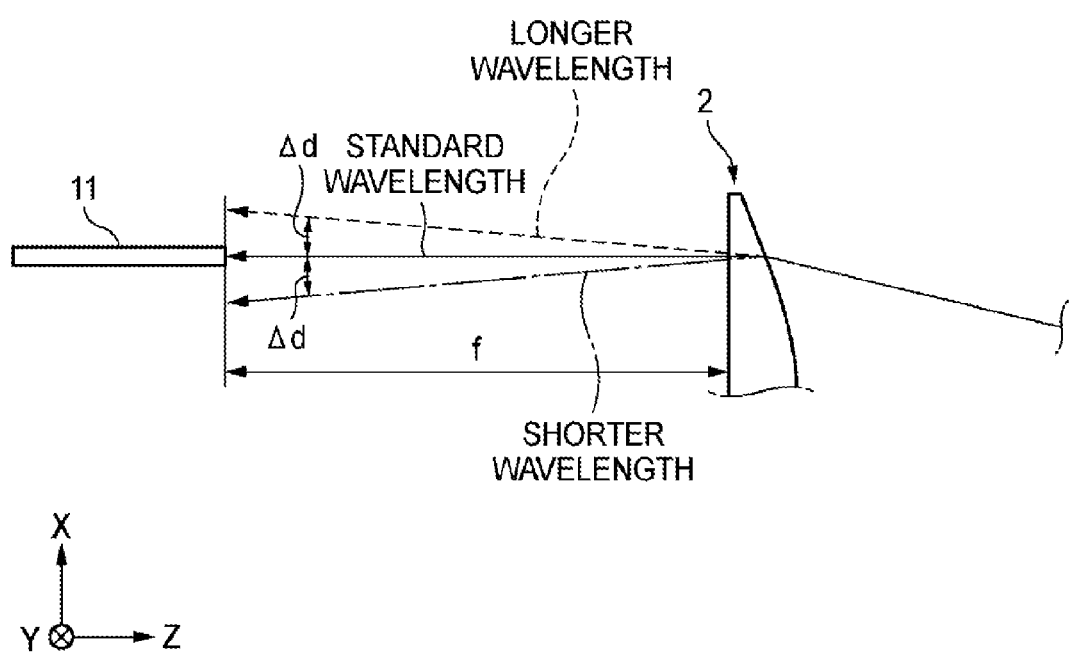
FIG. 3 illustrates a problem relating to the optical device according to the first embodiment.

For example, as shown in FIG. 3, light having the standard wavelength shines on the output optical fiber 11 after being deflected by the lens 2 so as to go along the optical axis of the output optical fiber 11. On the other hand, because of dispersion occurring in the lens 2, light whose wavelength is shorter or longer than the standard wavelength exits the lens 2 so as to go along a path that deviates from the optical axis of the output optical fiber 11. In this manner, the transmittance T given by Equation (2) varies from one wavelength to another and becomes smaller than that corresponding to the standard wavelength.

The above-described wavelength dependence of the optical characteristic of the optical device 5 is particularly remarkable when the focal length f of the lens 2 is great. This is because the deviation Δd from the optical axis of the output optical fiber 11 in the X-axis direction increases with the focal length f (see FIG. 3). In the embodiment, since the focal length f of the lens 2 is greater than or equal to 2.0 mm and shorter than 3.5 mm, that is, has a relatively large value, the wavelength dependence of the optical characteristic (transmittance) of the optical device 5 is strong.

The inventors have found that the wavelength dependence of the optical characteristic of the optical device 5 which uses the lens 2 having a relatively great focal length can be suppressed by paying attention to a dispersion index value of the glass material of the lens 2. This dispersion index is an application version of the Abbe number which is an index for evaluating dispersion of a transparent body. The dispersion index is an index obtained by evaluating a dispersion characteristic of a transparent body in a wavelength range of 1.2 to 1.7 μm with a central wavelength 1.45 μm used as a reference.

Wavelength dependence of the optical characteristic (transmittance) of the optical device 5 when each of five glass materials (glass material-1 to glass material-5) was used to form the lens 2 will be described with reference to FIGS. 4-11.

FIG. 4 is a table showing refractive index values $n(\lambda)$ at respective wavelengths $\lambda=1.2$ to 1.7 µm and a dispersion index value $\nu(1.45)$ (hereinafter referred to simply as a dispersion index value $\nu$) of each of glass material-1 to glass material-5 of the lens 2. The dispersion index $\nu$ is given by the following Equation (4):

$$\nu=\{n(1.45)-1\}/\{n(1.2)-n(1.7)\} \qquad (4)$$

where $n(1.45)$, $n(1.2)$, and $n(1.7)$ are refractive index values of the glass material of the lens 2 at respective wavelengths 1.45 µm, 1.2 µm, and 1.7 µm.

Figure 5:
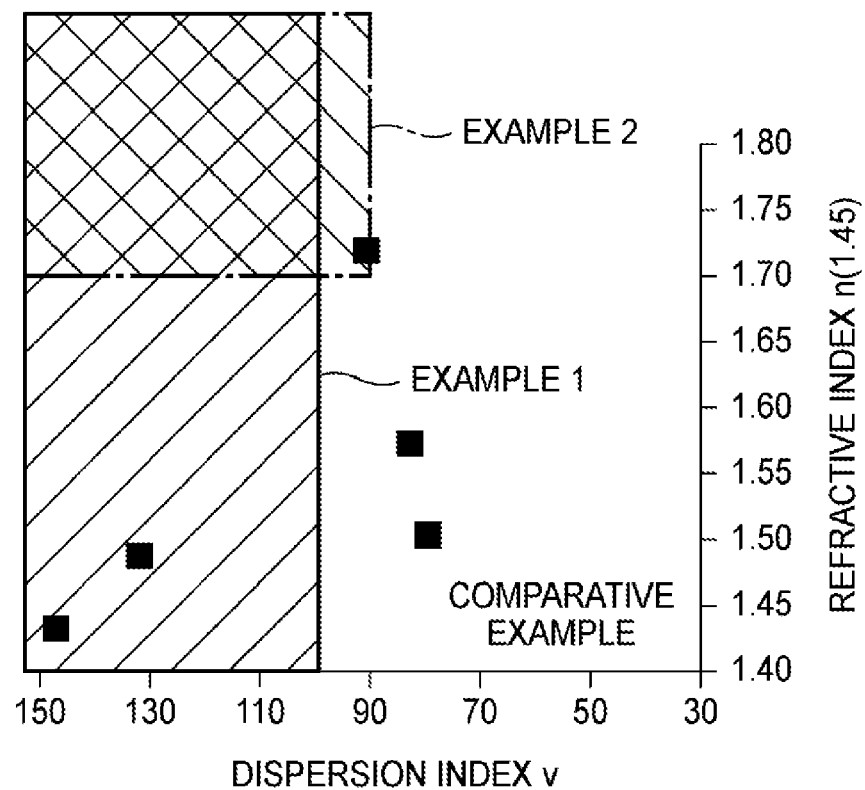
FIG. 5 is a graph showing dispersion index value ν vs. refractive index $n(1.45)$ plots of glass material-1 to glass material-5.

FIG. 5 is a graph showing dispersion index value $\nu$ vs. refractive index $n(1.45)$ plots of glass material-1 to glass material-5 (Examples 1 and 2 and Comparative Example of the embodiment). As shown in FIG. 5, a region of $\nu \geq 100$ which is enclosed by a solid line is classified as a region of Example 1, a region of $\nu \geq 90$ and $n(1.45) \geq 1.7$ which is enclosed by a chain line is classified as a region of Example 2, and the other region is classified as a region of Comparative Example. As seen from FIG. 5, glass material-1 and glass material-2 belong to Example 1, glass material-5 belongs to Example 2, and glass material-3 and glass material-4 belong to neither Example 1 nor Example 2, that is, belong to Comparative Example.

Figure 6:
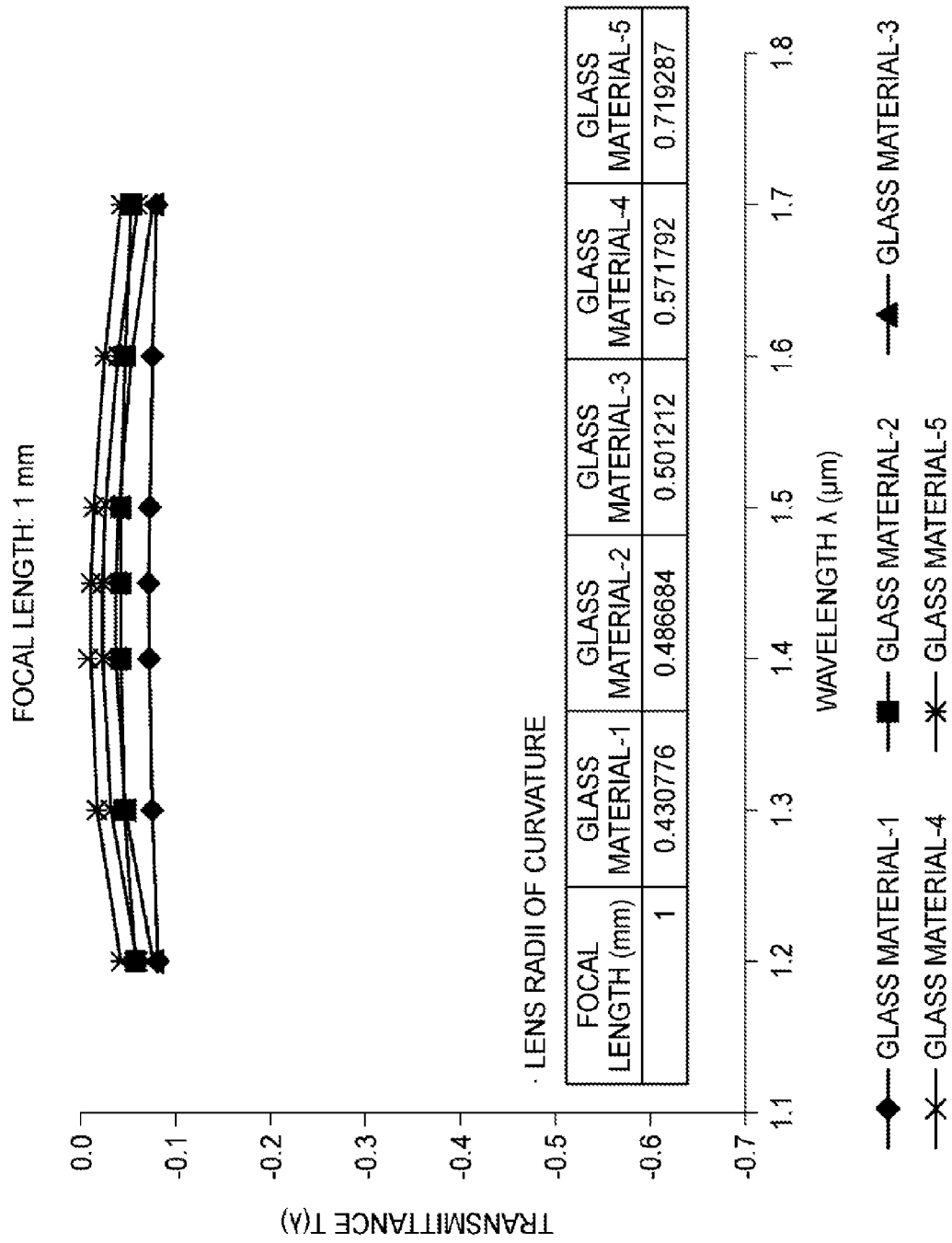
FIG. 6 is a graph showing calculation results of the transmittance T(λ) of the optical device according to the first embodiment at respective wavelengths λ in each of cases that lenses made of glass material-1 to glass material-5, respectively, and having a focal length 1 mm were applied to the optical device.

FIG. 6 is a graph showing calculation results of the transmittance $T(\lambda)$ of the optical device 5 shown in FIG. 1 at the respective wavelengths $\lambda$ in each of cases that lenses 2 made of glass material-1 to glass material-5, respectively, and having a focal length 1 mm were applied to the optical device 5. Values of the transmittance $T(\lambda)$ were calculated according to Equation (2) in a case that the reflection angle $\theta$ of the movable mirror 3 satisfied Equation (1) so as to provide maximum coupling efficiency. Values of parameters of the lens 2 were as follows. The lenses 2 were spherical lenses.

Focal length f: 1 mm
Lens thickness: 1 mm
Lens radii of curvature: see FIG. 6

In this case, all of the transmittance $T(\lambda)$ values in the wavelength range of 1.2 to 1.7 µm were larger than −0.1 dB irrespective of which of glass material-1 to glass material-5 was used to form the lens 2.

The wavelength dependence of the transmittance $T(\lambda)$ in the wavelength range of 1.2 to 1.7 µm is evaluated using a transmittance difference µT that is given by the following Equation (5). The wavelength dependence of the optical device 5 is judged weaker when the transmittance difference $\Delta T$ is smaller.

$$\Delta T=T(\lambda)\mathrm{max}-T(\lambda)\mathrm{min} \qquad (5)$$

where $T(\lambda)$max is a maximum transmittance $T(\lambda)$ value in the wavelength range of 1.2 to 1.7 µm and $T(\lambda)$min is a minimum transmittance $T(\lambda)$ value in the wavelength range of 1.2 to 1.7 µm.

As seen from FIG. 6, irrespective of which of glass material-1 to glass material-5 was used to form the lens 2, transmittance difference $\Delta T$ values in the wavelength range of 1.2 to 1.7 µm were smaller than or equal to 0.1 dB, which means that the wavelength dependence of the optical device 5 is weak. Thus, when the focal length f of the lens 2 was equal to 1 mm, the optical device 5 exhibited a good optical characteristic irrespective of which of glass material-1 to glass material-5 was used to form the lens 2.

Figure 7:
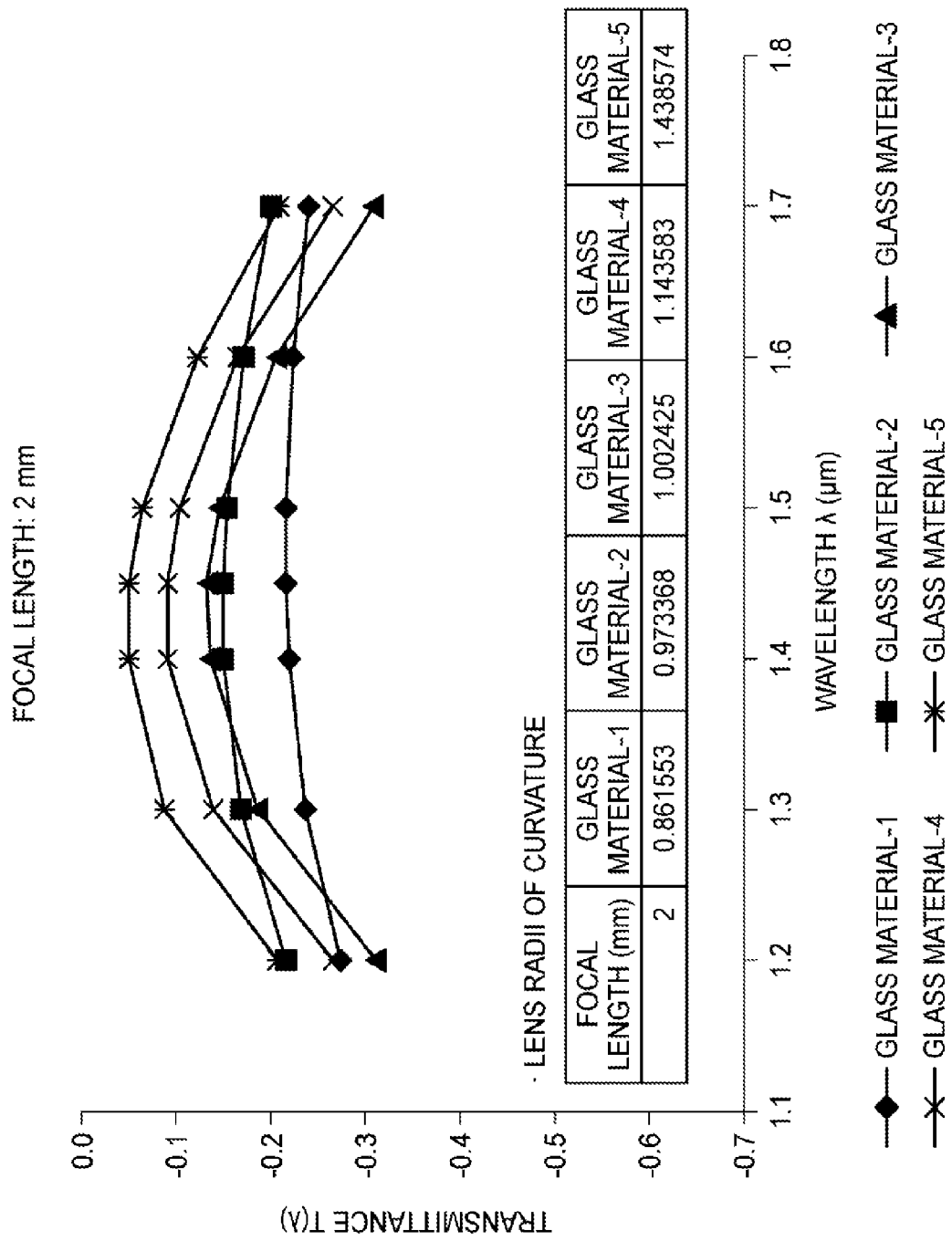
FIG. 7 is a graph showing calculation results of the transmittance T(λ) of the optical device according to the first embodiment at the respective wavelengths λ in each of cases that lenses made of glass material-1 to glass material-5, respectively, and having a focal length 2 mm were applied to the optical device.

FIG. 7 is a graph showing calculation results of the transmittance $T(\lambda)$ of the optical device 5 shown in FIG. 1 at the respective wavelengths $\lambda$ in each of cases that lenses 2 made of glass material-1 to glass material-5, respectively, and having a focal length 2 mm were applied to the optical device 5. Values of the transmittance $T(\lambda)$ were calculated according to Equation (2) in a case that the reflection angle $\theta$ of the movable mirror 3 satisfied Equation (1) so as to provide maximum coupling efficiency. Values of the parameters of the lens 2 were as follows. The lenses 2 were spherical lenses.

Focal length f: 2 mm
Lens thickness: 1 mm
Lens radii of curvature: see FIG. 7

In this case, irrespective of which of glass material-1 to glass material-5 was used to form the lens 2, all of the transmittance $T(\lambda)$ values in the wavelength range of 1.2 to 1.7 µm were larger than −0.4 dB, which are relatively good results.

Transmittance difference $\Delta T$ values calculated according to Equation (5) were smaller than or equal to 0.2 dB, that is, each optical device 5 exhibited sufficiently weak wavelength dependence. Thus, a relatively good result was obtained irrespective of which of glass material-1 to glass material-5 was used. In particular, the transmittance difference $\Delta T$ values of the cases using glass material-1 and glass material-2 were smaller than or equal to 0.1 dB. On the other hand, transmittance difference $\Delta T$ values of the cases using glass material-3, glass material-4, and glass material-5 were about 0.2 dB. That is, when the focal length f of the lens 2 is equal to 2.0 mm, the wavelength dependence of the transmittance $T(\lambda)$ of each of the cases using glass material-1 and glass material-2 is weaker than that of each of the cases using glass material-3, glass material-4, and glass material-5.

Figure 8:
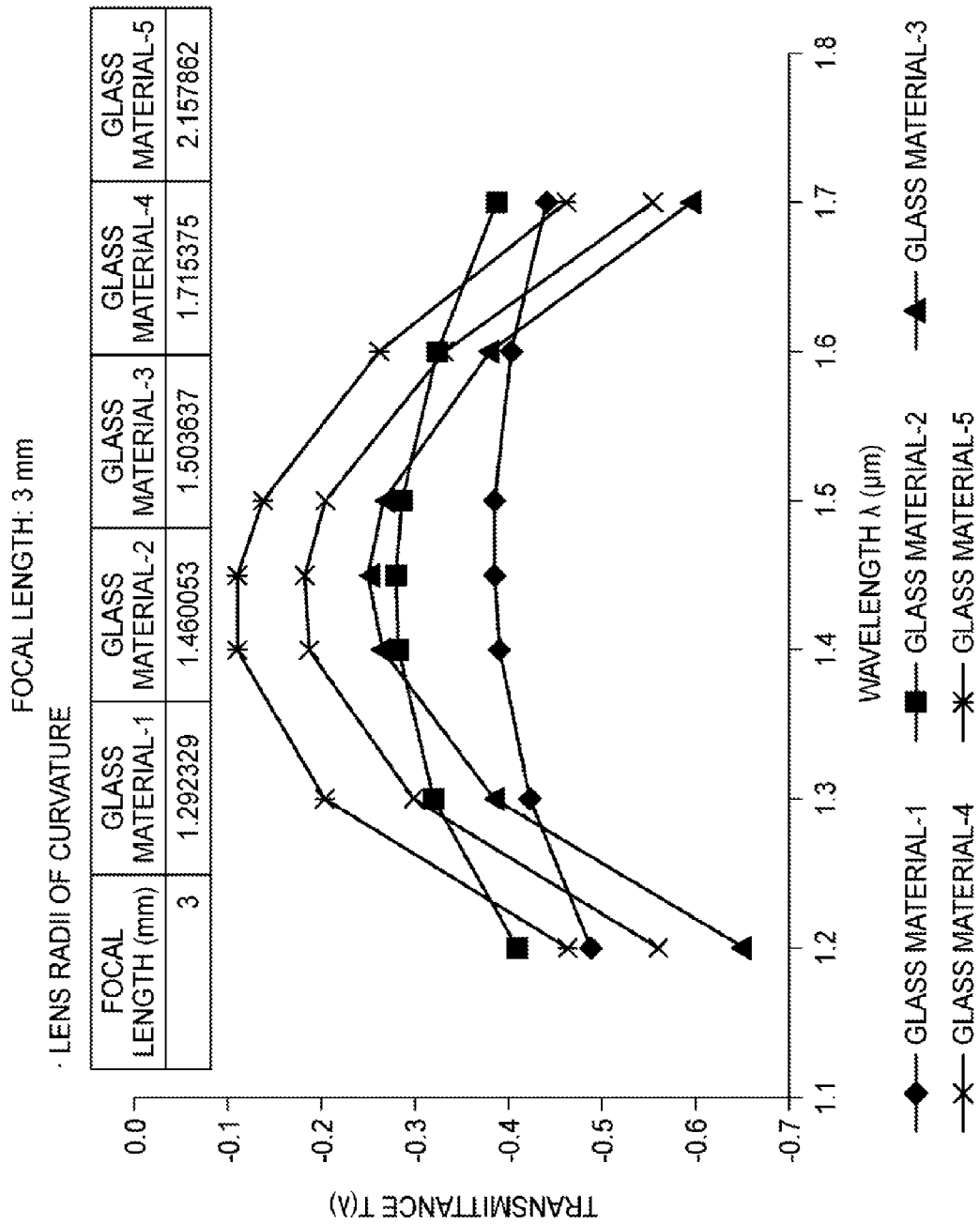
FIG. 8 is a graph showing calculation results of the transmittance T(λ) of the optical device according to the first embodiment at the respective wavelengths λ in each of cases that lenses made of glass material-1 to glass material-5, respectively, and having a focal length 3 mm were applied to the optical device.

FIG. 8 is a graph showing calculation results of the transmittance $T(\lambda)$ of the optical device 5 shown in FIG. 1 at the respective wavelengths $\lambda$ in each of cases that lenses 2 made of glass material-1 to glass material-5, respectively, and having a focal length 3 mm were applied to the optical device 5. Values of the transmittance $T(\lambda)$ were calculated according to Equation (2) in a case that the reflection angle $\theta$ of the movable mirror 3 satisfied Equation (1) so as to provide maximum coupling efficiency. Values of the parameters of the lens 2 were as follows. The lenses 2 were spherical lenses.

Focal length f: 3 mm
Lens thickness: 1 mm
Lens radii of curvature: see FIG. 8

In this case, the lenses 2 that were made of glass material-3 and glass material-4 had wavelength ranges where transmittance $T(\lambda)$ values were smaller than −0.5 dB. Therefore, the lenses 2 made of glass material-3 and glass material-4 are not suitable for optical devices using single-mode optical fibers. On the other hand, in the cases of the lenses 2 that were made of glass material-1, glass material-2, and glass material-5, all of the transmittance $T(\lambda)$ values were larger than −0.5 dB, which are relatively good results.

Furthermore, for the lenses 2 made of glass material-1 and glass material-2, transmittance difference $\Delta T$ values calculated according to Equation (5) were smaller than or equal to 0.2 dB, which are particularly good results. On the other hand, transmittance difference $\Delta T$ values of the cases using glass material-3, glass material-4, and glass material-5 were larger than 0.3 dB. That is, the wavelength dependence could not be suppressed sufficiently.

Figure 9:
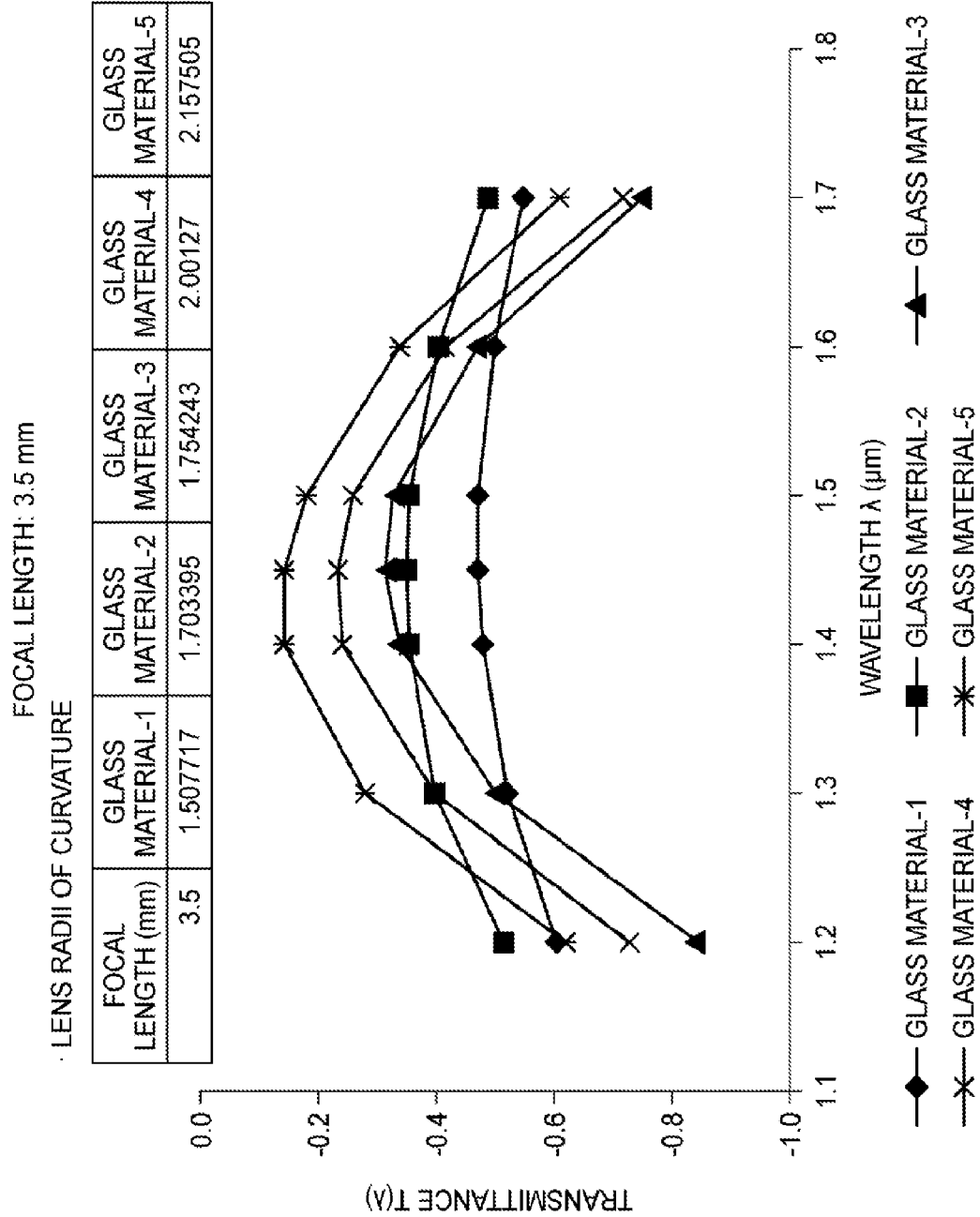
FIG. 9 is a graph showing calculation results of the transmittance T(λ) of the optical device according to the first embodiment at the respective wavelengths λ in each of cases that lenses made of glass material-1 to glass material-5, respectively, and having a focal length 3.5 mm were applied to the optical device.

FIG. 9 is a graph showing calculation results of the transmittance T(λ) of the optical device 5 shown in FIG. 1 at the respective wavelengths λ in each of cases that lenses 2 made of glass material-1 to glass material-5, respectively, and having a focal length 3.5 mm were applied to the optical device 5. Values of the transmittance T(λ) were calculated according to Equation (2) in a case that the reflection angle θ of the movable mirror 3 satisfied Equation (1) so as to provide maximum coupling efficiency. Values of the parameters of the lens 2 were as follows. The lenses 2 were spherical lenses.

Focal length f: 3.5 mm
Lens thickness: 1 mm
Lens radii of curvature: see FIG. 9

In this case, for the lenses 2 made of glass material-1 and glass material-2, transmittance difference ΔT values calculated according to Equation (5) were smaller than or equal to 0.2 dB, which are relatively good results. However, in any of the cases of the lenses 2 made of glass material-1 to glass material-5, there were wavelength ranges where transmittance T(λ) values were smaller than −0.5 dB. Therefore, the lenses 2 having the focal length f=3.5 mm are not suitable for optical devices using single-mode optical fibers.

Figure 10:
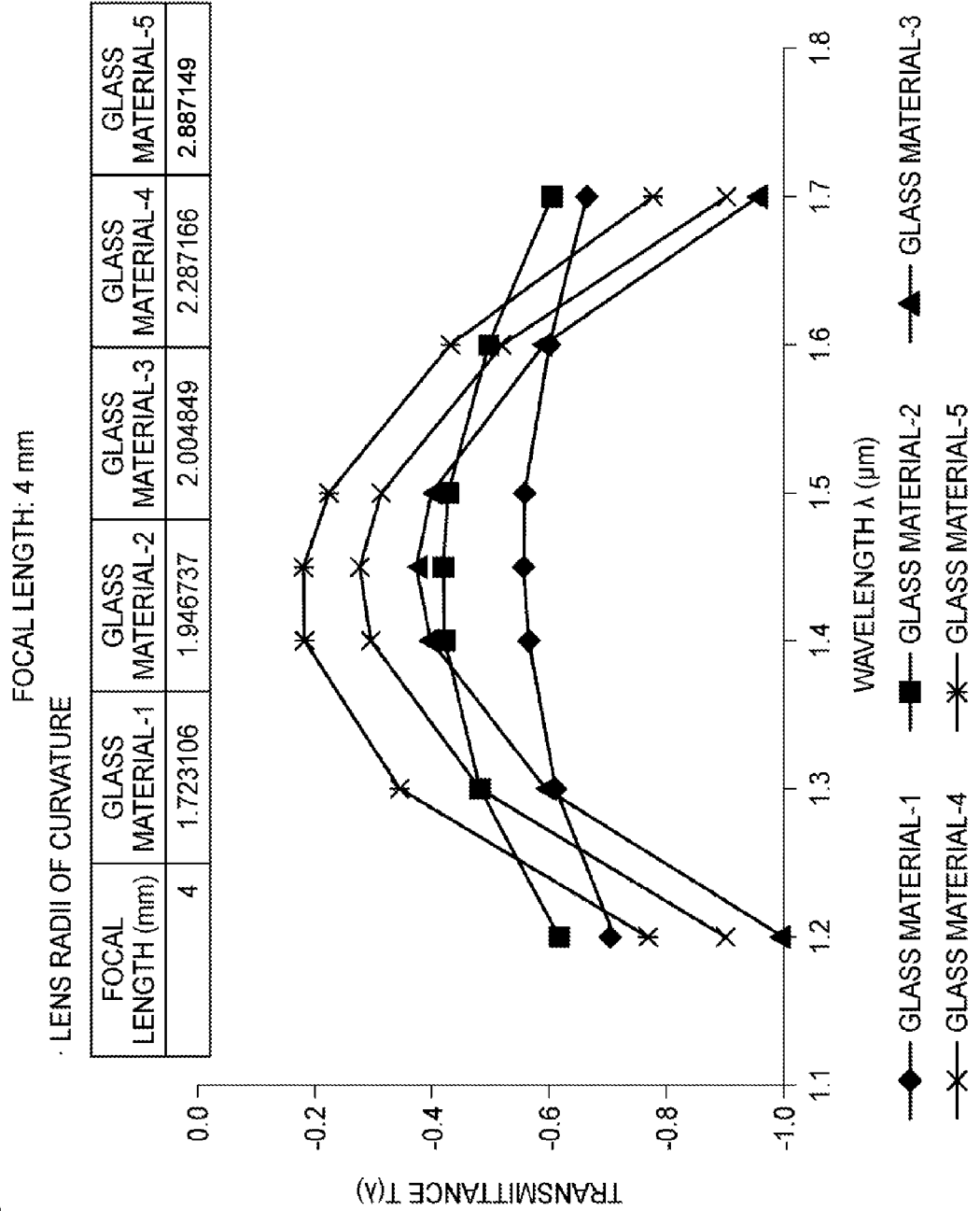
FIG. 10 is a graph showing calculation results of the transmittance T(λ) of the optical device according to the first embodiment at the respective wavelengths λ in each of cases that lenses made of glass material-1 to glass material-5, respectively, and having a focal length 4 mm were applied to the optical device.

FIG. 10 is a graph showing calculation results of the transmittance T(λ) of the optical device 5 shown in FIG. 1 at the respective wavelengths λ in each of cases that lenses 2 made of glass material-1 to glass material-5, respectively, and having a focal length 4 mm were applied to the optical device 5. Values of the transmittance T(λ) were calculated according to Equation (2) in a case that the reflection angle θ of the movable mirror 3 satisfied Equation (1) so as to provide maximum coupling efficiency. Values of the parameters of the lens 2 were as follows. The lenses 2 were spherical lenses.

Focal length f: 4.0 mm
Lens thickness: 1 mm
Lens radii of curvature: see FIG. 10

In this case, for the lenses 2 made of glass material-1 and glass material-2, transmittance difference ΔT values calculated according to Equation (5) were smaller than or equal to 0.2 dB, which are relatively good results. However, in any of the cases of the lenses 2 made of glass material-1 to glass material-5, there were wavelength ranges where transmittance T(λ) values were smaller than −0.5 dB. Therefore, the lenses 2 having the focal length f=4.0 mm are not suitable for optical devices using single-mode optical fibers.

As described above, the lenses 2 that were made of glass material-1 and glass material-2 and whose focal lengths f were shorter than 3.5 mm exhibited good transmittance T(λ) values and transmittance difference ΔT values in the wavelength range of 1.2 to 1.7 μm. Where glass material-1 or glass material-2 is used, various aspherical surface parameters can be employed in the lens 2 and the degree of freedom of lens designing is thus high. As a result, an optical device 5 whose wavelength dependence is suppressed can be provided by forming the lens 2 using glass material-1 or glass material-2.

In the lenses 2 that were made of glass material-5 and whose focal lengths f were shorter than 3.5 mm, all the transmittance T(λ) values were larger than −0.5 dB which were good results though the transmittance difference ΔT values in the wavelength range of 1.2 to 1.7 μm were relatively large. On the other hand, the refractive index n(λ) values of glass material-5 are as relatively large as 1.7 to 1.8 in the wavelength range of 1.2 to 1.7 μm. Therefore, the lenses 2 made of glass material-5 are less prone to cause aberrations because they can realize a desired optical characteristic even with small lens curvature. As a result, an optical device 5 having a good optical characteristic can be provided by forming the lens 2 using glass material-5.

On the other hand, the lenses 2 that were made of glass material-3 and glass material-4 did not exhibit good transmittance T(λ) values and transmittance difference ΔT values in the wavelength range of 1.2 to 1.7 μm. Therefore, even if an aspherical lens is formed using glass material-3 or glass material-4, resulting improvement in characteristic would be insufficient because of dispersion. Thus, glass material-3 and glass material-4 are not suitable for optical devices that need to use lenses having relatively great focal lengths.

Figure 11:
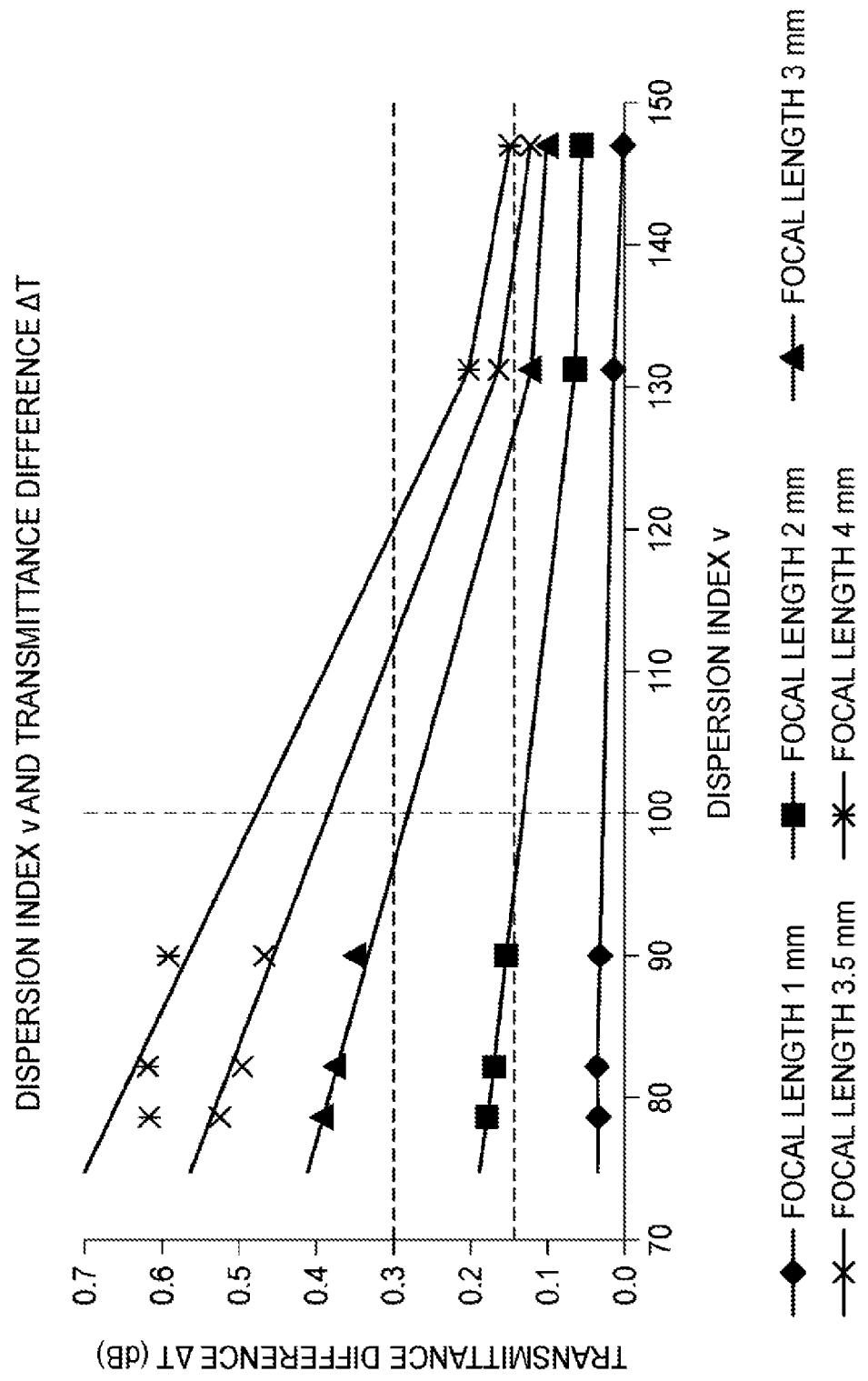
FIG. 11 is a graph showing relationships between the dispersion index ν and the transmittance difference ΔT in the cases of sets of lenses having respective focal lengths.

FIG. 11 is a graph showing relationships between the dispersion index ν and the transmittance difference ΔT in the cases of the sets of lenses 2 having the respective focal lengths f=1.0, 2.0, 3.0, 3.5, and 4.0 mm. More specifically, FIG. 11 show relationships between the dispersion index ν (the values of glass material-1 to glass material-5 shown in FIG. 4) and the transmittance difference ΔT (the values of glass material-1 to glass material-5 shown in FIGS. 6-10) for each of the focal lengths f.

As mentioned above, where a glass material exhibiting a good optical characteristic is used, various aspherical surface parameters can be employed in the lens 2 and the degree of freedom of lens designing can thus be increased. In particular, it is preferable that the transmittance difference ΔT corresponding to the glass material of a spherical lens be smaller than or equal to 0.3 dB, is even preferable that that corresponding to the glass material of a spherical lens be smaller than or equal to 0.2 dB, and is most preferable that that corresponding to the glass material of a spherical lens be smaller than or equal to 0.15 dB.

Therefore, to make the transmittance difference ΔT smaller than or equal to 0.3 dB while securing a focal length f of the lens 2 that is greater than or equal to 2.0 mm, it suffices that the focal length f be set greater than or equal to 2.0 mm and shorter than 3.5 mm (preferably shorter than or equal to 3.0 mm) and the dispersion index ν be set larger than or equal to 100.

Furthermore, to make the transmittance difference ΔT smaller than or equal to 0.15 dB while securing a focal length f of the lens 2 that is greater than or equal to 2.0 mm, it suffices that the focal length f be set greater than or equal to 2.0 mm and shorter than 3.5 mm (preferably shorter than or equal to 3.0 mm) and the dispersion index be set larger than or equal to 130. The transmittance difference ΔT varies gently in a dispersion index ν range over 130. Therefore, taking the easiness of acquisition of a glass material into consideration, it is even preferable that the dispersion index ν be in a range of 130 to 150.

Figure 12:
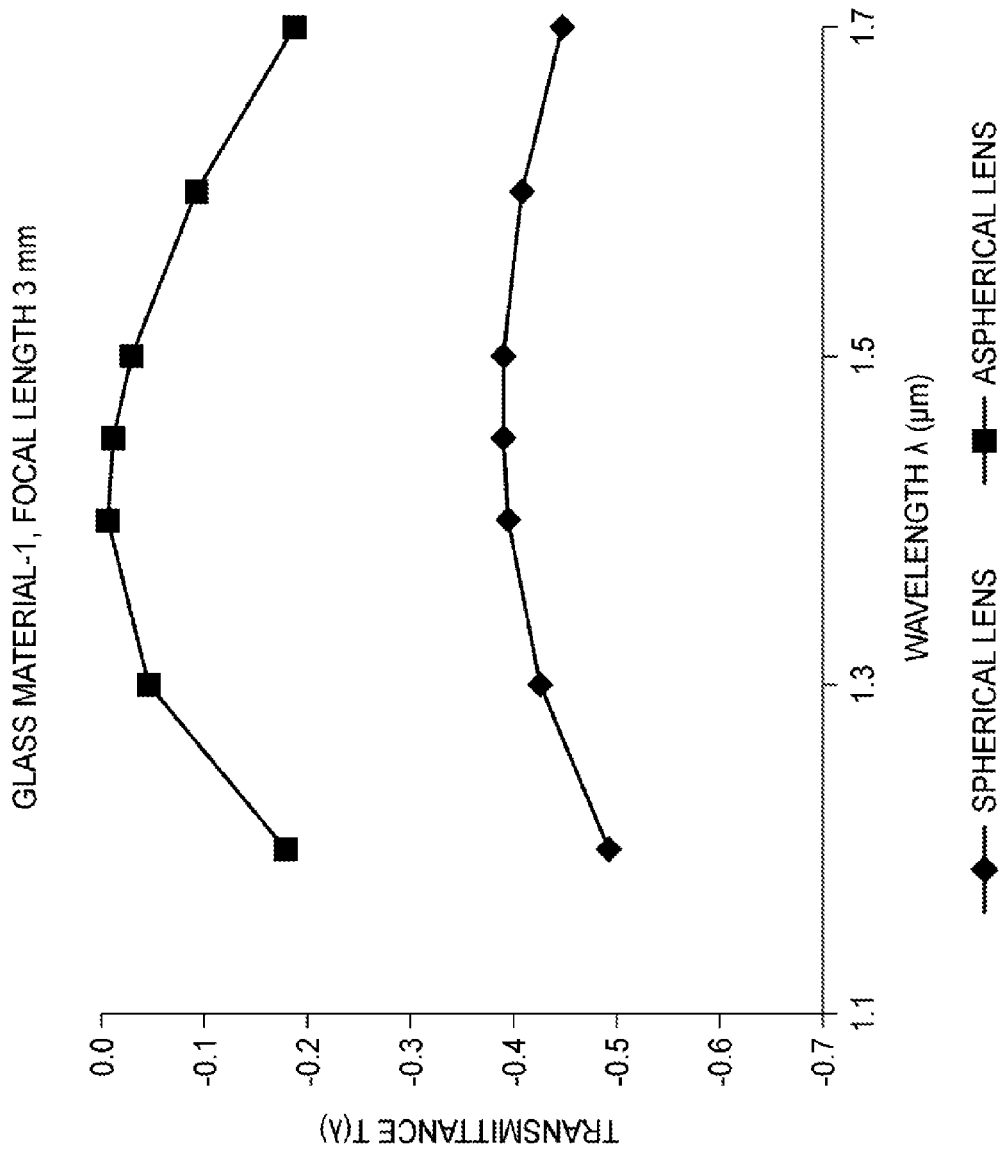
FIG. 12 is a graph showing calculation results of the transmittance T(λ) of the optical device according to the first embodiment at the respective wavelengths λ in each of cases that a spherical lens and an aspherical lens made of glass material-1 and having a focal length 3 mm were applied to the optical device.

FIG. 12 is a graph showing an optical characteristic, in the wavelength range of 1.2 to 1.7 μm, of an optical device 5 using a lens 2 that is an aspherical lens made of glass material-1. More specifically, FIG. 12 shows calculation results of the transmittance T(λ) of the optical device 5 shown in FIG. 1 at the respective wavelengths λ in each of cases that a spherical lens 2 and an aspherical lens 2 made of glass material-1 and having a focal length 3 mm were applied to the optical device 5. Values of the transmittance T(λ) were calculated according to Equation (2) in a case that the reflection angle θ of the movable mirror 3 satisfied Equation (1) so as to provide maximum coupling efficiency.

The parameter values of the aspherical lens 2 made of glass material 1 were the same as those of the spherical lens 2 that was described above with reference to FIG. 8:

Focal length f: 3 mm
Lens thickness: 1 mm

Lens radii of curvature: approximately 1.29

For the aspherical lens 2, an aspherical surface profile (sag values) were set according to the following Equation (6):

[Formula 1]

$$Z(S) = \frac{Cs^2}{1+\sqrt{1-(1+k)c^2s^2}} + A_4s^4 + A_6s^6 + A_8s^8 \ldots, \quad (6)$$

In Equation (6), Z is the sag amount, s is the distance from the optical axis (in the radial direction), c is a radius of curvature, k is a conic constant, and An's are aspherical surface coefficients. In Equation (6), the conic constant k was set at −0.55397 and the aspherical surface coefficient A was set at 0.

In this case, T(λ)max was larger than −0.1 dB and the transmittance difference ΔT was smaller than 0.2 dB. In this manner, an optical device 5 can be provided that has a good optical characteristic in the wavelength range of 1.2 to 1.7 μm and in which the wavelength dependence of the optical characteristic is suppressed. Furthermore, since the transmittance T(1.2) at the wavelength 1.2 μm is approximately equal to the transmittance T(1.7) at the wavelength 1.7 μm, an optical device 5 can be provided that is highly suitable for a PON communication system.

Figure 13:
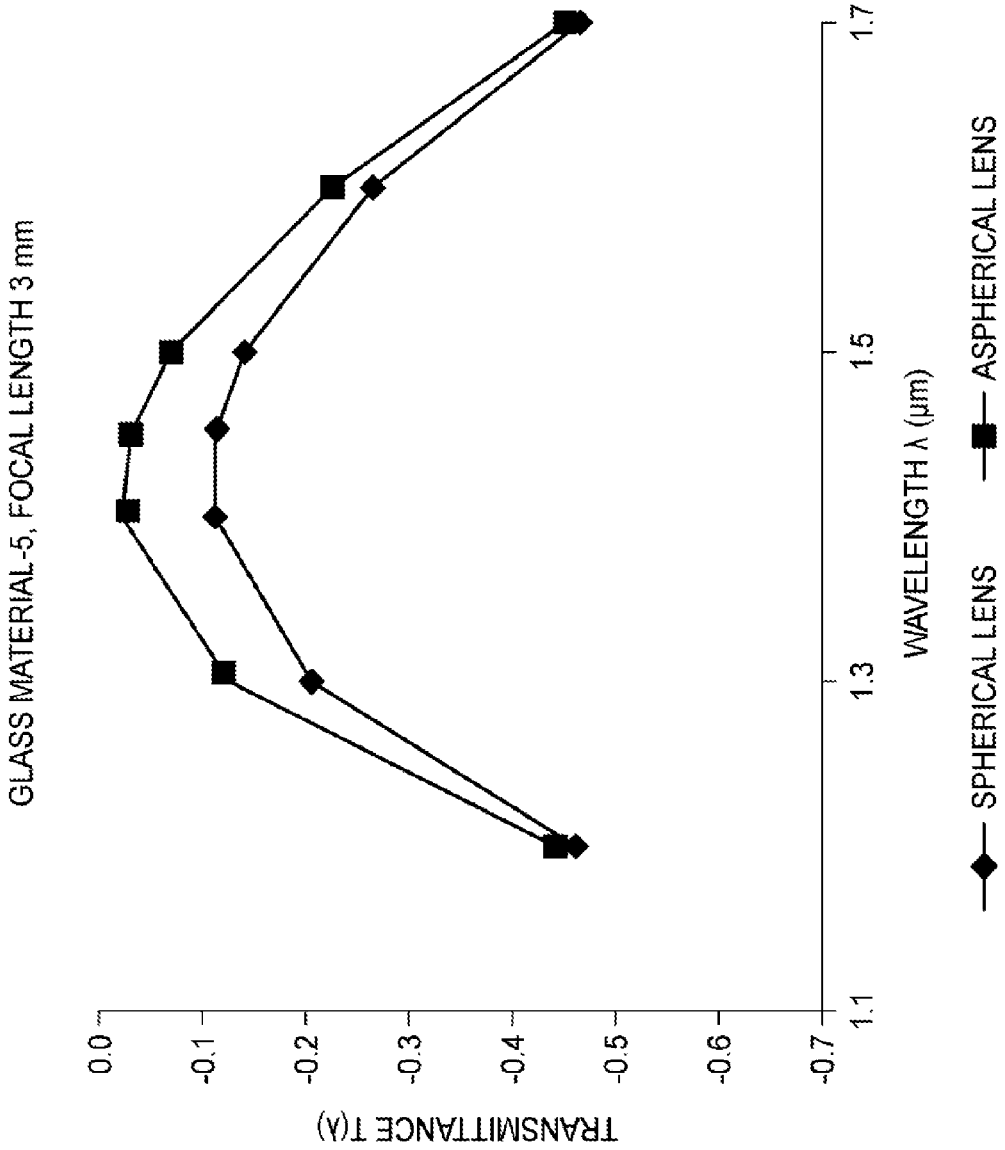
FIG. 13 is a graph showing calculation results of the transmittance T(λ) of the optical device according to the first embodiment at the respective wavelengths λ in each of cases that a spherical lens and an aspherical lens made of glass material-1 and having a focal length 3 mm were applied to the optical device.

FIG. 13 is a graph showing an optical characteristic, in the wavelength range of 1.2 to 1.7 μm, of an optical device 5 using a lens 2 that is an aspherical lens made of glass material-1. More specifically, FIG. 13 shows calculation results of the transmittance T(λ) of the optical device 5 shown in FIG. 1 at the respective wavelengths λ in each of cases that a spherical lens 2 and an aspherical lens 2 made of glass material-1 and having a focal length 3 mm were applied to the optical device 5. Values of the transmittance T(λ) were calculated according to Equation (2) in a case that the reflection angle θ of the movable mirror 3 satisfied Equation (1) so as to provide maximum coupling efficiency.

The parameter values of the aspherical lens 2 made of glass material 1 were the same as those of the spherical lens 2 that was described above with reference to FIG. 8:

Focal length f: 3 mm
Lens thickness: 1 mm
Lens radii of curvature: approximately 2.16

For the aspherical lens 2, an aspherical surface profile (sag values) were set according to the above Equation (6). The conic constant in Equation (6) was set at −0.34169 and the aspherical surface coefficient A was set at 0.

In this case, the transmittance T(λ) values in the wavelength range of 1.2 to 1.7 μm were all larger than −0.5 dB and T(λ)max was larger than −0.1 dB and the transmittance difference ΔT was smaller than 0.2 dB. As such, the optical device 5 has a good optical characteristic in the wavelength range of 1.2 to 1.7 μm. Furthermore, since the transmittance T(1.2) at the wavelength 1.2 μm is approximately equal to the transmittance T(1.7) at the wavelength 1.7 μm, an optical device 5 can be provided that is highly suitable for a PON communication system.

The first embodiment will be summarized below. By forming the lens 2 using a glass material whose dispersion index ν is larger than or equal to 100 (Example 1), the transmittance difference ΔT of the optical device 5 can be made small even in the case where the focal length f of the lens 2 is relatively great (greater than or equal to 2.0 mm and shorter than 3.5 mm).

By forming the lens 2 using a glass material whose dispersion index ν is larger than or equal to 90 and refractive index n(1.45) is larger than or equal to 1.7 (Example 2), T(λ)max of the optical device 5 can be made sufficiently large even in the case where the focal length f of the lens 2 is relatively great (greater than or equal to 2.0 mm and shorter than 3.5 mm).

Embodiment 2

Figure 14:
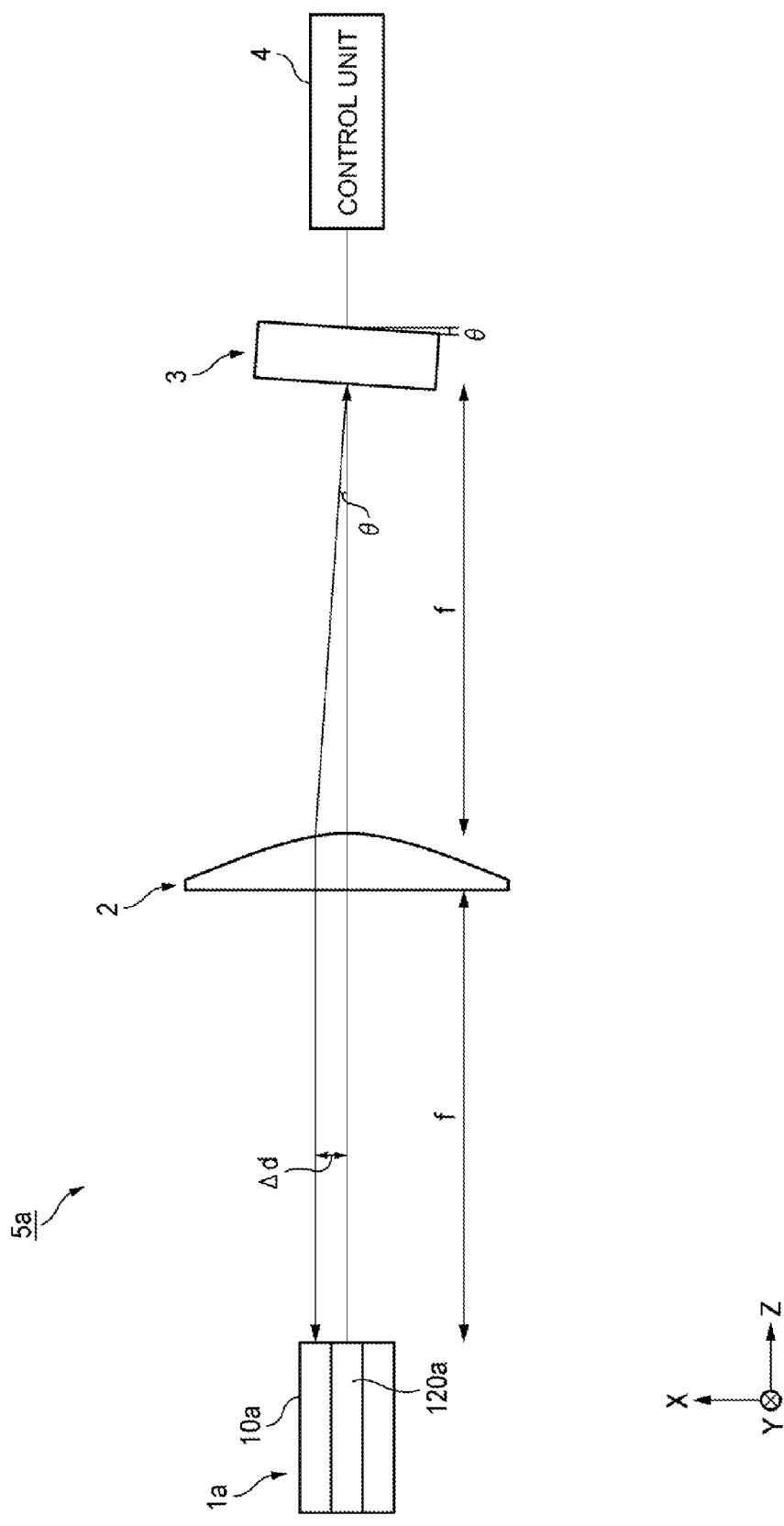
FIG. 14 is a schematic diagram showing an optical device according to a second embodiment of the present invention which is a variable optical attenuator.

FIG. 14 shows an optical device 5a according to a second embodiment. Members, units, etc. having the same ones in the first embodiment will be given the same reference symbols as the latter and descriptions therefor will be omitted. For convenience of description, only a central ray is shown in FIG. 14.

In the second embodiment, the optical device 5a is a variable optical attenuator and is equipped with an input/output module 2a, a lens 2, a movable mirror 3, and a control unit 4. The input/output module 1a has one optical fiber 10a which functions as an input port and an output port. The output end of the optical fiber 10a is placed at the front focal point of the lens 2, and the reflection surface of the movable mirror 3 is placed at the rear focal point of the lens 2.

Light that is emitted from the optical fiber 10a is collimated by the lens 2 and then shines on the movable mirror 3. The light that is reflected from the movable mirror 3 at a reflection angle θ is deflected by the lens 2 and then focused so as to be coupled into a core 120a of the optical fiber 10a. At this time, the reflection angle θ is controlled so that the light shines on the optical fiber 10a at a position that deviates from its center axis by Δd in the X-axis direction. The deviation Δd is given by the following Equation (7):

$$\Delta d = f \tan \theta \quad (7)$$

where f is the focal length of the lens 2 and θ is the inclination angle of the movable mirror 3.

The intensity of light entering the optical fiber 10a decreases as the deviation Δd increases. Therefore, the intensity of light entering the optical fiber 10a can be controlled by varying the inclination angle θ of the movable mirror 3. Thus, the optical device 5a can function as a variable optical attenuator.

The basic principle of operation of the optical device 5a according to the second embodiment is approximately the same as that of the optical device 5 described in the first embodiment which is an optical switch. Therefore, for the same reason as described in the first embodiment, it is preferable that the variation Δθ of the inclination angle θ of the movable mirror 3 be small and hence the focal length f of the lens 2 should be large. On the other hand, as the focal length f of the lens 2 is increased, the wavelength dependence of the optical characteristic of the optical device 5a becomes stronger though a resulting small angular variation Δθ makes it possible to control the light attenuation amount more precisely. This is because as described in the first embodiment the deviation Δd from the optical axis of the optical fiber 10a in the X-axis direction varies depending on the wavelength due to the dispersion of the lens 2.

Therefore, also in the second embodiment, an optical device 5a the wavelength dependence of whose optical characteristic can be suppressed can be provided by forming the lens 2 using a glass material of Example 1. Furthermore, an optical device 5a that exhibits a good optical characteristic can be provided by forming the lens 2 using a glass material of Example 2.

Embodiment 3

Figure 15:
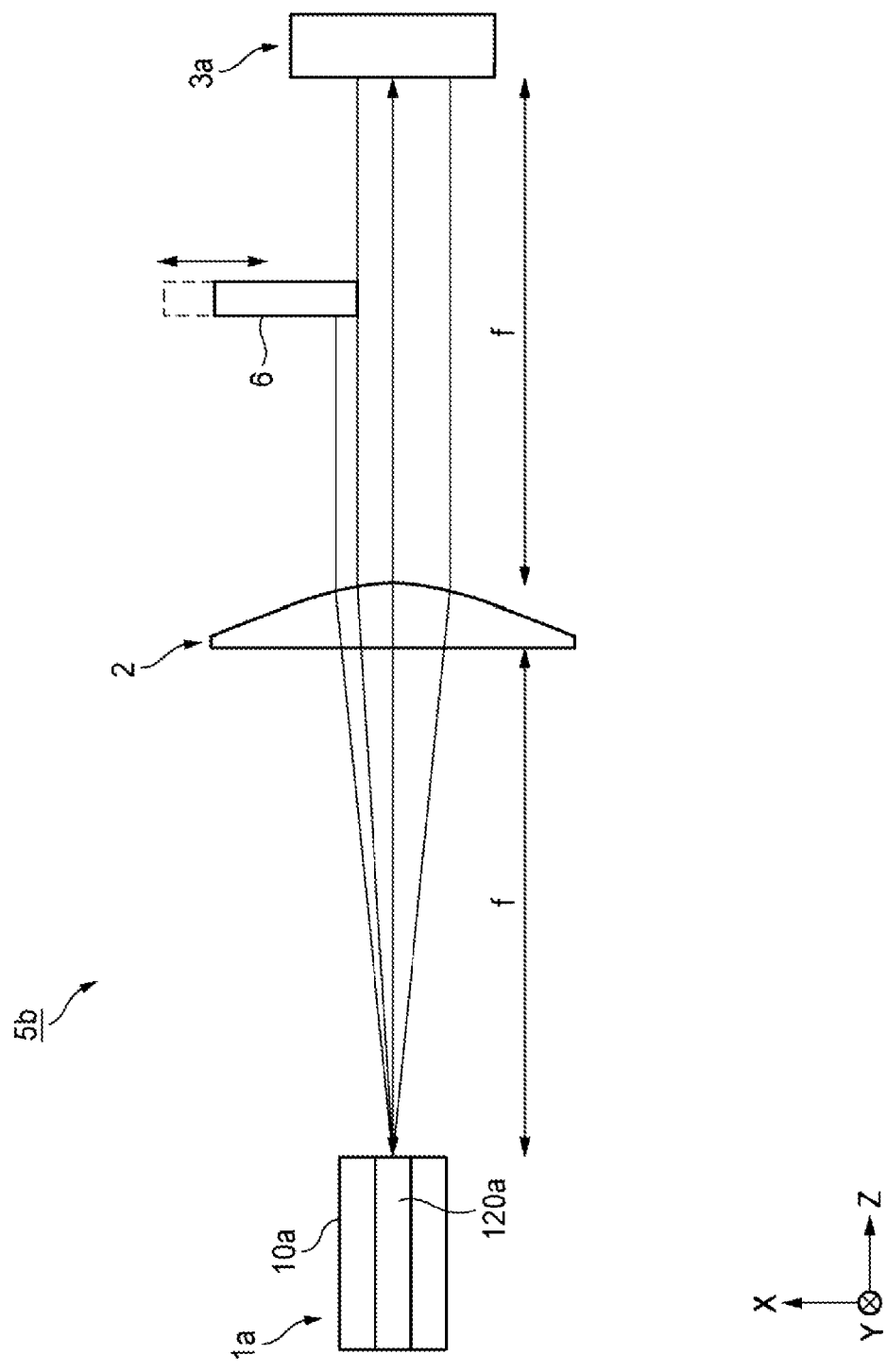
FIG. 15 is a schematic diagram showing an optical device according to a third embodiment of the present invention which is a variable optical attenuator.

FIG. 15 shows an optical device 5b according to a third embodiment. Members, units, etc. having the same ones in the first or second embodiment will be given the same reference symbols as the latter and descriptions therefor will be omitted. For convenience of description, plural rays that are included in divergent light emitted from an optical fiber 1a are shown in FIG. 14.

In the third embodiment, the optical device 5b is a variable optical attenuator and is equipped with an input/output module 1a, a lens 2, a fixed mirror 3a, and a movable shutter 6. The input/output module 1a has one optical fiber 10a which functions as an input port and an output port. The output end of the optical fiber 10a is placed at the front focal point of the lens 2, and the reflection surface of the fixed mirror 3a is placed at the rear focal point of the lens 2.

Light that is emitted from the optical fiber 10a is collimated by the lens 2. Part of the collimated light is absorbed or reflected by the movable shutter 6, and the remaining part of the light shines on the fixed mirror 3a. The movable shutter 6 may be such as to be inclined with respect to the optical axis of the lens 2. Alternatively, the reflection surface of the movable shutter 6 may be formed with steps for diffuse reflection.

The fixed mirror 3a has a reflection surface that is perpendicular to the optical axis of the lens 2. Light that is reflected from the fixed mirror 3a is focused by the lens 2 so as to be coupled into a core 120a of the optical fiber 10a. In the embodiment, the intensity of light entering the optical fiber 10a can be controlled according to a movement distance of the movable shutter 6 which is moved in the −X direction. Thus, the optical device 5b can function as a variable optical attenuator.

In the optical device 5b according to the embodiment, when the focal length f of the lens 2 is set greater, the diameter of a light beam that exits the lens 2 is increased, which allows the light attenuation amount to be controlled precisely by the movable shutter 6. On the other hand, when the focal length f of the lens 2 is increased, the wavelength dependence of the optical characteristic of the optical device 5b becomes noticeable due to dispersion of the lens 2.

Therefore, also in the third embodiment, an optical device 5b the wavelength dependence of whose optical characteristic can be suppressed can be provided by forming the lens 2 using a glass material of Example 1. Furthermore, an optical device 5b that exhibits a good optical characteristic can be provided by forming the lens 2 using a glass material of Example 2.

The embodiments of the invention have been described above. However, the technical scope of the invention should not be determined on the basis of the embodiments but on the basis of the scope of the claims and its equivalents.

The invention claimed is:

1. An optical device comprising:
an input/output module having at least one optical fiber;
a deflection unit which deflects, toward the input/output module, light that is received from the input/output module; and
a lens which couples the input/output module and the deflection unit to each other optically and has a focal length that is greater than or equal to 2.0 mm and shorter than 3.5 mm,
wherein a dispersion index ν of the optical device that is given by an equation:

$$\nu=\{n(1.45)-1\}/\{n(1.2)-n(1.7)\}$$

where n(1.45), n(1.2), and n(1.7) are refractive indices of a glass material of the lens at wavelengths 1.45 μm, 1.2 μm, and 1.7 μm, respectively, is larger than or equal to 100.

2. The optical device according to claim 1, wherein the focal length is greater than or equal to 2.0 mm and shorter than or equal to 3.0 mm.

3. The optical device according to claim 1, wherein the dispersion index ν is larger than or equal to 130.

4. The optical device according to claim 1, wherein the lens is a spherical lens, and the glass material of the lens is such that a difference between a maximum value and a minimum value of the transmittance T(λ) of the optical device in a wavelength range of 1.2 to 1.7 μm is smaller than or equal to 0.3 dB, the transmittance T(λ) being given by an equation:

$$T(\lambda)=10\cdot\log\{Pout(\lambda)/Pin(\lambda)\}$$

where Pin(λ) is intensity of light that is emitted from the input/output module and has a wavelength λ and Pout (λ) is intensity of light that is coupled into the input/output module via the lens and the deflection unit and has the wavelength λ.

5. The optical device according to claim 1, wherein the lens is a spherical lens, and the glass material of the lens is such that the transmittance T(λ) of the optical device is larger than or equal to −0.5 dB in a wavelength range of 1.2 to 1.7 μm, the transmittance T(λ) being given by an equation:

$$T(\lambda)=10\cdot\log\{Pout(\lambda)/Pin(\lambda)\}$$

where Pin(λ) is intensity of light that is emitted from the input/output module and has a wavelength λ and Pout (λ) is intensity of light that is coupled into the input/output module via the lens and the deflection unit and has the wavelength λ.

6. The optical device according to claim 1, wherein the lens is an aspherical lens, and the glass material of the lens is such that the maximum value of the transmittance T(λ) is larger than or equal to −0.1 dB and the difference between the maximum value and the minimum value of the transmittance T(λ) is smaller than or equal to 0.2 dB in the wavelength range of 1.2 to 1.7 μm, and a transmittance T(1.2) at a wavelength 1.2 μm is approximately equal to a transmittance T(1.7) at a wavelength 1.7 μm.

7. An optical device comprising:
an input/output module having at least one optical fiber;
a deflection unit which deflects, toward the input/output module, light that is received from the input/output module; and
a lens which couples the input/output module and the deflection unit to each other optically and has a focal length that is greater than or equal to 2.0 mm and shorter than 3.5 mm,
wherein a dispersion index ν of the optical device that is given by an equation:

$$\nu=\{n(1.45)-1\}/\{n(1.2)-n(1.7)\}$$

where n(1.45), n(1.2), and n(1.7) are refractive indices of a glass material of the lens at the wavelengths 1.45 μm, 1.2 μm, and 1.7 μm, respectively, is larger than or equal to 90, and the refractive index n(1.45) at the wavelength 1.45 μm is larger than or equal to 1.7.

8. The optical device according to claim 7, wherein the focal length is greater than or equal to 2.0 mm and shorter than or equal to 3.0 mm.

9. The optical device according to claim 7, wherein the lens is a spherical lens, and the glass material of the lens is such that the transmittance T(λ) of the optical device is larger than or equal to −0.5 dB in a wavelength range of 1.2 to 1.7 μm, the transmittance T(λ) being given by an equation:

$$T(\lambda) = 10 \cdot \log \{P\text{out}(\lambda)/P\text{in}(\lambda)\}$$

where Pin(λ) is intensity of light that is emitted from the input/output module and has a wavelength λ and Pout (λ) is intensity of light that is coupled into the input/output module via the lens and the deflection unit and has the wavelength λ.

10. The optical device according to claim 7, wherein the lens is an aspherical lens, and the glass material of the lens is such that the maximum value of the transmittance T(λ) is larger than or equal to −0.1 dB in the wavelength range of 1.2 to 1.7 μm, and that a transmittance T(1.2) at a wavelength 1.2 μm is approximately equal to a transmittance T(1.7) at a wavelength 1.7 μm.

11. The optical device according to claim 1, wherein:

the optical device is an optical switch;

the input/output module comprises an input optical fiber which emits light and first and second optical fibers to receive, via the lens, light deflected by the deflection unit; and the optical device further comprises a control unit which causes the light deflected by the deflection unit to shine on the first output fiber or the second output fiber by varying the light deflection angle of the deflection unit.

* * * * *